Aug. 21, 1951  C. TRICKEY  2,565,006
CARRIER FOR BOX CAMERAS
Filed May 29, 1950

Inventor -
Clarence Trickey
By
Attorney

Patented Aug. 21, 1951

2,565,006

UNITED STATES PATENT OFFICE 2,565,006

CARRIER FOR BOX CAMERAS

Clarence Trickey, Ville Lasalle, Quebec, Canada

Application May 29, 1950, Serial No. 165,047

5 Claims. (Cl. 224—52)

This invention relates to, improvements in carriers for box cameras and the object of the invention is to provide a simple and inexpensive carrier of good appearance, which will not interfere with the operation of the camera so that the camera may be used while in the carrier and without any preliminary adjustment or opening of the carrier.

Various types of carrying cases for expensive cameras have been produced but all these are designed to completely cover the camera and must be opened and adjustd before the camera can be used. Moreover, such cases are expensive. So far as I am aware, no carrier has been produced for box cameras, with the result the owners of such cameras are compelled to carry them by hand, which is inconvenient and frequently leads to the camera being damaged by falling to the ground, or by being laid down and forgotten or stolen. These circumstances apply particularly to inexpensive box cameras which do not warrant a costly carrying case and which are generally required to be used on such short notice that there is no time to open and adjust a carrying case, or to remove the camera before being able to use it. The carrier of my invention fills this long felt want by providing an inexpensive carrier which may be slung from the owner's shoulder, thus leaving his or her hands free while, at the same time, minimizing the chance of damage to or loss of the camera, and which leaves all the operating parts of the camera accessible so that the camera is always ready for instant use.

Broadly speaking, the invention consists in a stirrup member shaped to engage the bottom and sides of a box camera and so formed as to leave all working parts of the camera exposed, a camera securing member to pass from side to side of the stirrup member over the top of the camera, and a carrying member connected at its ends to the stirrup member sides and preferably of a length to permit the camera to be carried slung from the operator's shoulder, in position convenient for instant use.

In greater detail, the invention consists in the features and combinations of features herein disclosed, together with all such modifications thereof and substitutions of equivalents therefor as are within the scope of the appended claims.

In the accompanying drawings which illustrate two embodiments of the invention but to which embodiments and the details thereof the invention is not limited, as modifications, especially those required to adapt the invention to different makes of cameras, are contemplated:

Figure 1:
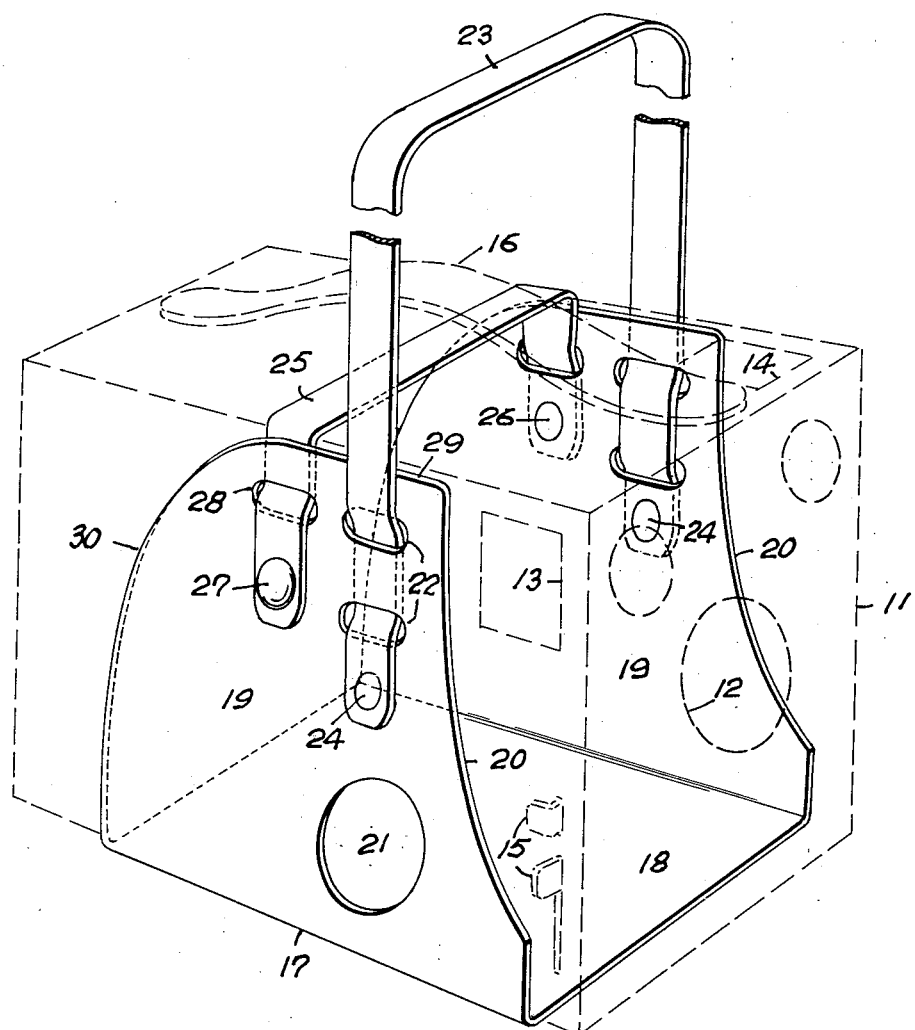
Fig. 1 is a perspective view of a carrier according to my invention adapted to a conventional form of box camera which is illustrated in broken lines in position in the carrier.

Referring more particularly to the drawings, 11 designates a box camera having at its front end a lens opening 12; side and top view finders 13 and 14, respectively; and shutter release and diaphragm controls 15; on its top a carrying handle 16.

The carrier comprises a U-shaped stirrup member 17 including a central portion 18 adapted to underlie the bottom of a box camera, from side to side thereof, and side portions 19 connected to the side edges of the bottom portion 18 and adapted to extend upwardly from the bottom portion, substantially in contact with the sides of a box camera, up to or nearly to the top of the camera. The stirrup bottom 18 need not underlie more than a portion of the length of the camera bottom and, in the interest of lightness of weight and economy of material, it is advisable that it should underlie only sufficient of the length of the camera to afford a secure support for the camera. Thus, the stirrup preferably does not extend to the extreme front and back ends of the camera.

The front edges 20 of the side portions 19 incline rearwardly from approximately the bottom to the top and are thereby formed to expose the side view finder 13 of the camera and the shutter release and diaphragm controls 15. As a camera has only one side view finder, it follows that for any camera only one of the stirrup sides need be so formed but by making the two sides alike, the carrier accommodates a camera having its side view finder on either the right hand or the left hand side. In addition, a symmetrical form is obtained and enhances the appearance, especially if the forward edge is concavely curved, as shown.

One of the sides 19 is formed with an opening 21 through which the film winding means of the camera may project and be accessible for operation while the camera is in the carrier and without any adjustment of the carrier, this opening being positioned according to the position of the film wind of the camera for which the carrier is designed.

Each side member 19 is formed with short upper and lower, spaced, longitudinally extending slots 22 through which the end portions of a carrying means 23, such as a shoulder length strap, are passed and connected to the side members 19 below the lower slot by any suitable means, such as the rivets indicated at 24. If rivets alone were used to attach the carrying strap, the stirrup and camera therein would tend to oscillate about the rivets and would soon cause such wear as to make the attachment insecure, but by passing the end portions of the strap 23 through the upper and lower slots 22, above the rivets 24, oscillation and wear are prevented. It will be noted the transverse vertical plane of the stirrup containing the rivets 24 is somewhat nearer the front of the stirrup than the back thereof, so that when the camera, which is usually heaver in the front, is in position in the stirrup and suspended by the strap 23, it will be in equilibrium and will carry comfortably in a horizontal position. It will be understood the aforesaid points of attachment of the carrying strap are positioned according to the camera for which the carrier is designed, to produce the aforesaid support in equilibrium.

Figure 2:
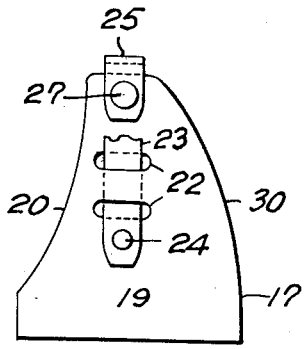
Fig. 2 is a side elevation of a modified form of the carrier of Fig. 1.

Means 25 to retain the camera in the stirrup is connected at one end to the upper part of one side member 19, as by a rivet 26, and extends across to the other side member, to which it is releasably connected by any suitable means, such as the snap fastener indicated at 27. The length of the member 25 is such that it will overlie a camera in the stirrup and be in close contact with the camera top so as to hold it securely in the stirrup, the position of the securing means being such that it will pass under the usual handle 16 of the camera. Thus, even if the camera is shifted lengthwise in the stirrup, it cannot escape therefrom. Preferably, the retaining means 25 is located rearwardly of the transverse vertical plane of the rivets 24 and passes through slots 28 in the side members 19, located in rear of the slots 22, as shown in Fig. 1; but the means 25 may be located in the said plane of the rivets 24 and the slots 28 omitted, as shown in Fig. 2. This enables provision of a shorter and less expensive carrier.

It will be noted in Fig. 1 that the end portions of the retaining means 25 pass outwardly through the slots 28 and are secured to the outer surfaces of the side members 19, so that the free end of the member and the fastening 27 are readily accessible. Also, the end portions of the carrying strap 23 pass inwardly through the upper slots 22 and outwardly through the lower slots. This arrangement causes the strap 23 to urge the side members 19 against the camera sides when the same is carried by the strap, so that the camera tends to be clamped between the side members 19 and thus held against movement in the stirrup.

The upper edge 29 of each side member 19 is preferably shorter than and approximately parallel with the lower edge; and the rear edge 30 preferably extends upwardly and forwardly in a pleasing curve to merge into the top edge, thus avoiding sharp corners which might catch on the user's garments and interfere with instant use of the camera.

From the foregoing, it will be seen that the carrier of my invention so holds a camera that it cannot escape and, at the same time, leaves the camera front, top, back and parts of the sides exposed so that the lens, view finders and operating controls of the camera are always accessible for instant use, without any adjustment of the carrier. The front and back ends of the camera are completely unobstructed so that either may be removed, while the camera is in the carrier, to change film.

Having thus described my invention, I claim:

1. A carrier for transporting a box camera comprising a U-shaped stirrup including a bottom and sides to engage substantial areas of the bottom and opposite sides of a camera while leaving the front, top, back and parts of the sides of the camera uncovered and the camera lens, view finders, operating controls and film changing arrangements of the camera always exposed; camera securing means attached at one end to one stirrup side and adapted to pass over the top of the camera, under the handle thereof, and to be releasably connected to the other stirrup side; and a carrying strap connected at its ends to the stirrup sides.

2. A carrier according to claim 1, having an opening in one of the stirrup sides for passage of a camera film winding means, said opening determining the position of a camera in the carrier, and the points of attachment of said carrying strap being so positioned relatively to said opening that the camera is in equilibrium when suspended by said carrying strap.

3. A carrier according to claim 1 in which each stirrup side is formed with a slot through which the carrying strap passes and below which the strap, is secured to the stirrup side.

4. A carrier for a box camera comprising a stirrup including a bottom member and side members, the front edges of said side members being formed to expose portions of camera sides presenting camera operating controls; upper and lower slots formed in said sides; a carrying strap having its end portions passing through said slots and connected to the sides below the lower slots; and a camera securing strap permanently connected at one end to one of said sides and releasably connected at its other end to the other of said sides, said securing strap being adapted to pass over the top of a camera in the stirrup, beneath the camera handle, whereby the camera will be held against escape from the carrier.

5. A carrier according to claim 4 in which the stirrup sides are formed with slots spaced longitudinally of the camera from said first named slots and through which last named slots the securing strap passes.

CLARENCE TRICKEY.

REFERENCES CITED

The following references are of record in the file of this patent:

UNITED STATES PATENTS

| Number | Name | Date |
|---|---|---|
| 1,542,730 | Richards | June 16, 1925 |
| 2,223,219 | Mayerovitz | Nov. 26, 1940 |

FOREIGN PATENTS

| Number | Country | Date |
|---|---|---|
| 586,404 | Germany | July 13, 1932 |
| 643,136 | Germany | Mar. 25, 1937 |